Figure 1:
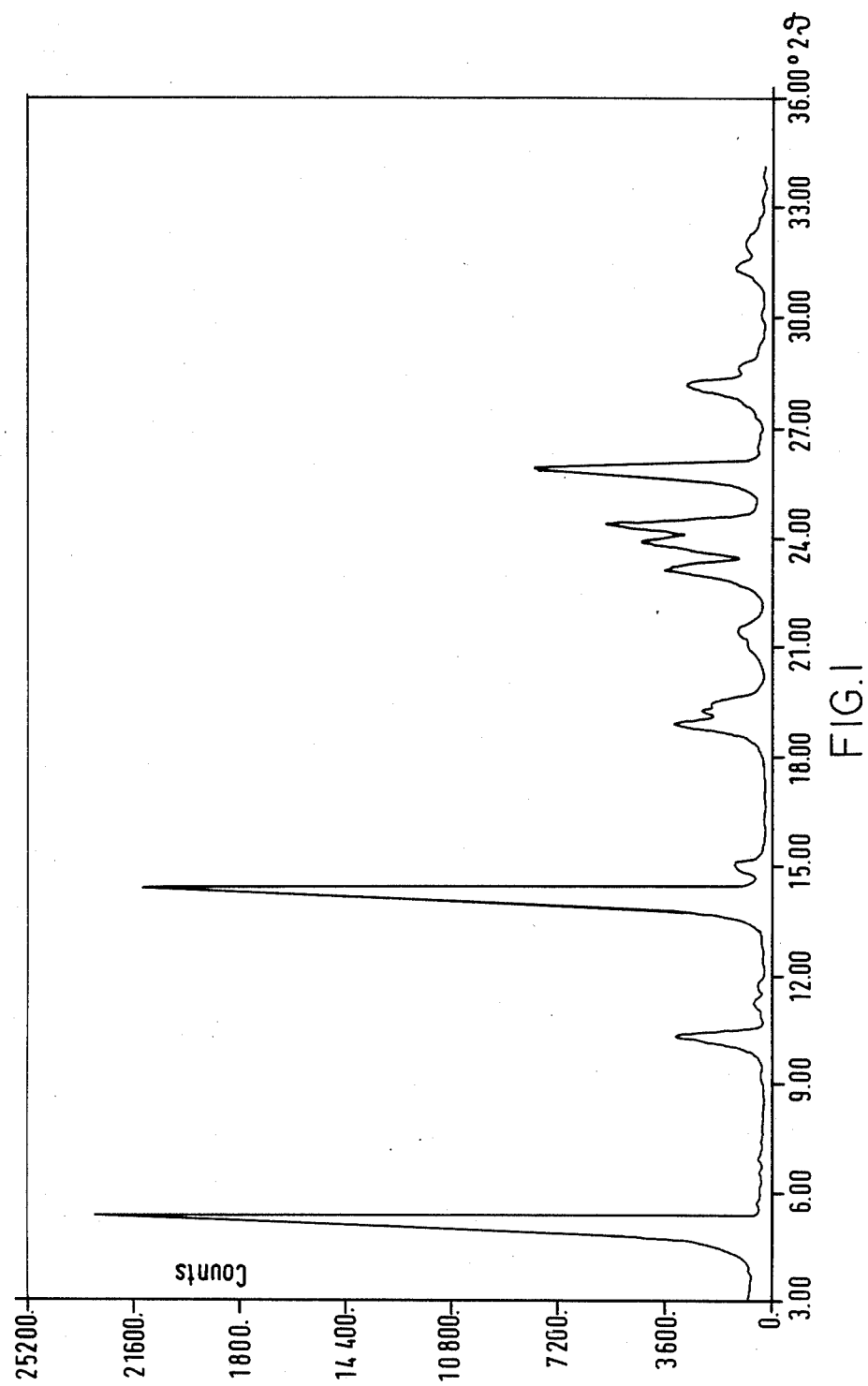

United States Patent

Spietschka et al.

[11] Patent Number: 4,769,460
[45] Date of Patent: Sep. 6, 1988

[54] MIX-CRYSTAL PIGMENTS BASED ON PERYLENETETRACARBIMIDES, PROCESS FOR PREPARING AND THEIR USE.

[75] Inventors: Ernst Spietschka, Idstein; Helmut Tröster, Königstein, both of Fed. Rep. of Germany

[73] Assignee: Hoechst Aktiengesellschaft, Frankfurt, Fed. Rep. of Germany

[21] Appl. No.: 144,779

[22] Filed: Jan. 20, 1988

[30] Foreign Application Priority Data

Oct. 3, 1984 [DE] Fed. Rep. of Germany ....... 3436206

[51] Int. Cl.$^4$ ............................................. C09B 57/00
[52] U.S. Cl. ..................................... 546/37; 524/90; 106/498
[58] Field of Search ........................ 546/37; 524/90; 106/288 Q

[56] References Cited

U.S. PATENT DOCUMENTS 3,554,776  1/1971  Gerson et al. ................. 106/288 Q

FOREIGN PATENT DOCUMENTS 1094897 12/1960 Fed. Rep. of Germany .
2009073  9/1970 Fed. Rep. of Germany .
51-7025   1/1976 Japan .
897707    5/1962 United Kingdom .

Primary Examiner—Donald G. Daus
Assistant Examiner—William A. Teoli, Jr.
Attorney, Agent, or Firm—Connolly and Hutz

[57] ABSTRACT

Process for preparing perylenetetracarbimide mix-crystal pigments in the crystal lattice of the α-modification of the N,N'-bis-3',5'-dimethylphenylperylenetetracarbimide of the formula (1) comprising essentially symmetrical N,N'-bis-3',5'-dimethylphenylperylenetetracarbimide of the formula (1) and at least one asymmetrically substituted diimide of the formula (2) in which R stands for methyl or ethyl

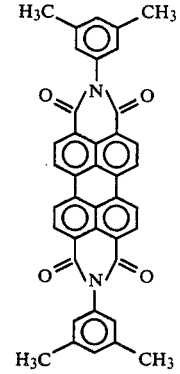

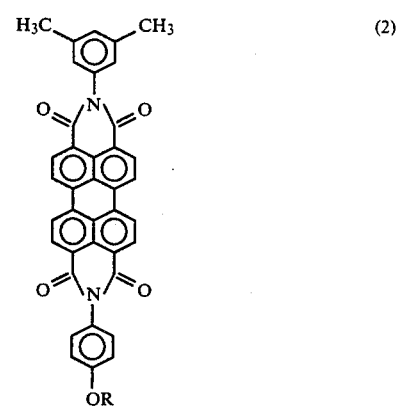

by condensing 1 mole of perylenetetracarboxylic dianhydride with an excess of up to 30 moles of 3,5-dimethylaniline which contains in total 0.5–6 percent by weight of 4-ethoxyaniline, and their use for coloring organic polymers.

1 Claim, 2 Drawing Sheets

MIX-CRYSTAL PIGMENTS BASED ON PERYLENETETRACARBIMIDES, PROCESS FOR PREPARING AND THEIR USE

REFERENCE TO RELATED APPLICATION

This is a continuation under 37 CFR 1.62 of copending U.S. application Ser. No. 782,498 filed Oct. 1, 1985 by Ernst Spietschka and Helmut Troster for Mix-Crystal Pigments based on Perylenetetracarbimides, Process for Preparing Their Use, now abandoned.

The present invention relates to a process for preparing mix-crystal pigments based on perylenetetracarbimides in the crystal lattice of the α-modification of N,N'-bis-3', 5'-dimethylphenylperylenetetracarbimide and to the use of the mix-crystal pigments thus obtained for coloring organic polymers.

For use in high-melting plastics, pigments should not only have high light and weathering fastness properties but also be able to withstand the high processing temperatures without change in the color impression, i.e. have adequate thermal stability. In this field of use, there is increasing interest in organic colorants as alternatives to the previously predominantly used cadmium pigments.

The range of available organic pigments for high-melting synthetic polymers, in particular polyolefins, is incomplete owing to the required high thermal stability.

It has been known for a long time that the perylene pigment of the formula (1)

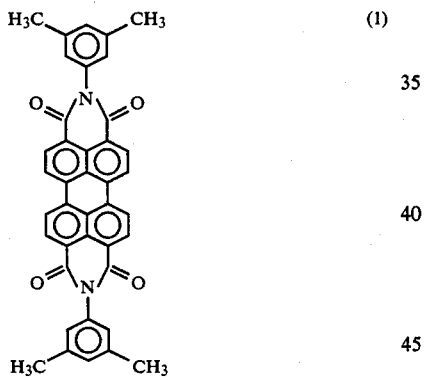

is particularly suitable for obtaining bright red shades in the field of use in question. This compound, which is obtainable by the method of German Patent No. 1,067,157 (U.S. Pat. No. 2,905,685) and which is produced therein in a crystal phase which is referred to in Japanese Patent Application J No. 51007-025 and in European Patent No. 023,191 (U.S. Pat. No. 4,404,385) as the α-modification, produces after conversion into a finely divided pigment form, for example by means of conventional milling in a vibratory or roll mill, a pure red coloration of high tinctorial strength and good thermal stability.

The increased use of high-melting polymers such as polypropylene and the trend toward higher production speeds in the case of plastics goods has in recent years led to a toughening of the thermal conditions and hence also to the demand for a further increase in the thermal stability of this pigment.

Moreover, many plastics converters have long expressed a wish for a distinctly yellower, strong red of appropriate fastness level.

It is true that the available N,N'-bis-4'-ethoxyphenyl-perylenetetracarbimide of the formula (3)

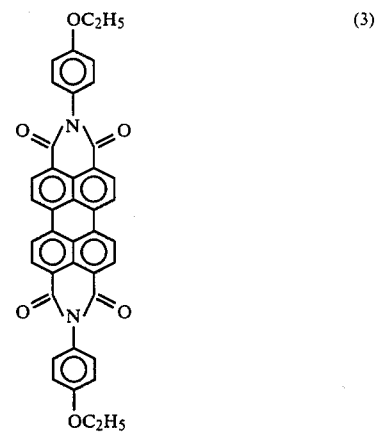

which has been known for a long time is such a bright yellowish red. However, the inadequate thermal stability of this pigment rules out any use in high-melting polymers, in which, at the high processing temperatures, it undergoes a color change toward bluish red.

It has now been found that it is possible to prepare perylenetetracarbimide mix-crystal pigments in the crystal lattice of the α-modification of N,N'-bis-3',5'-dimethylphenylperylenetetracarbimide of the formula (1) comprising essentially the symmetrical N,N'-bis-3',5'-dimethylphenylperylenetetracarbimide of the formula (1) and at least one asymmetrically substituted diimide of the formula (2) in which R stands for a methyl or ethyl group

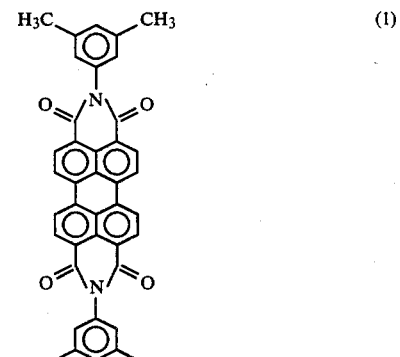

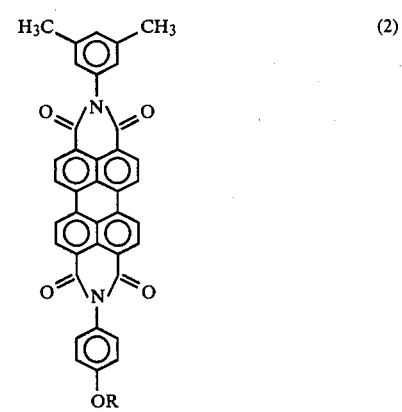

by condensing one mole of perylenetetracarboxylic dianhydride with an excess of up to 30 moles of 3,5-dimethylaniline which contains in total 0.5–6 percent by weight of 4-ethoxyaniline and/or 4-methoxyaniline.

The perylenetetracarbimide mix-crystal pigments thus obtainable produce after a conversion into a finely divided pigmentary form using customary finishing methods, for example milling, in high-melting polymers, in particular polyethylene and polypropylene, colorations which, compared with the pure pigment of the stated formula (1), have a distinctly improved thermal stability and, in particular in those cases where the mix-crystal component of the formula (2) contains the ethoxy group, also have a desired yellower hue. The degree of the shift toward yellow can be controlled by variation of the amount of 4-ethoxyaniline in the 3,5-dimethylaniline. A less pronounced shift toward yellowish red, however, can also be obtained with 4-methoxyaniline.

Figure 2:
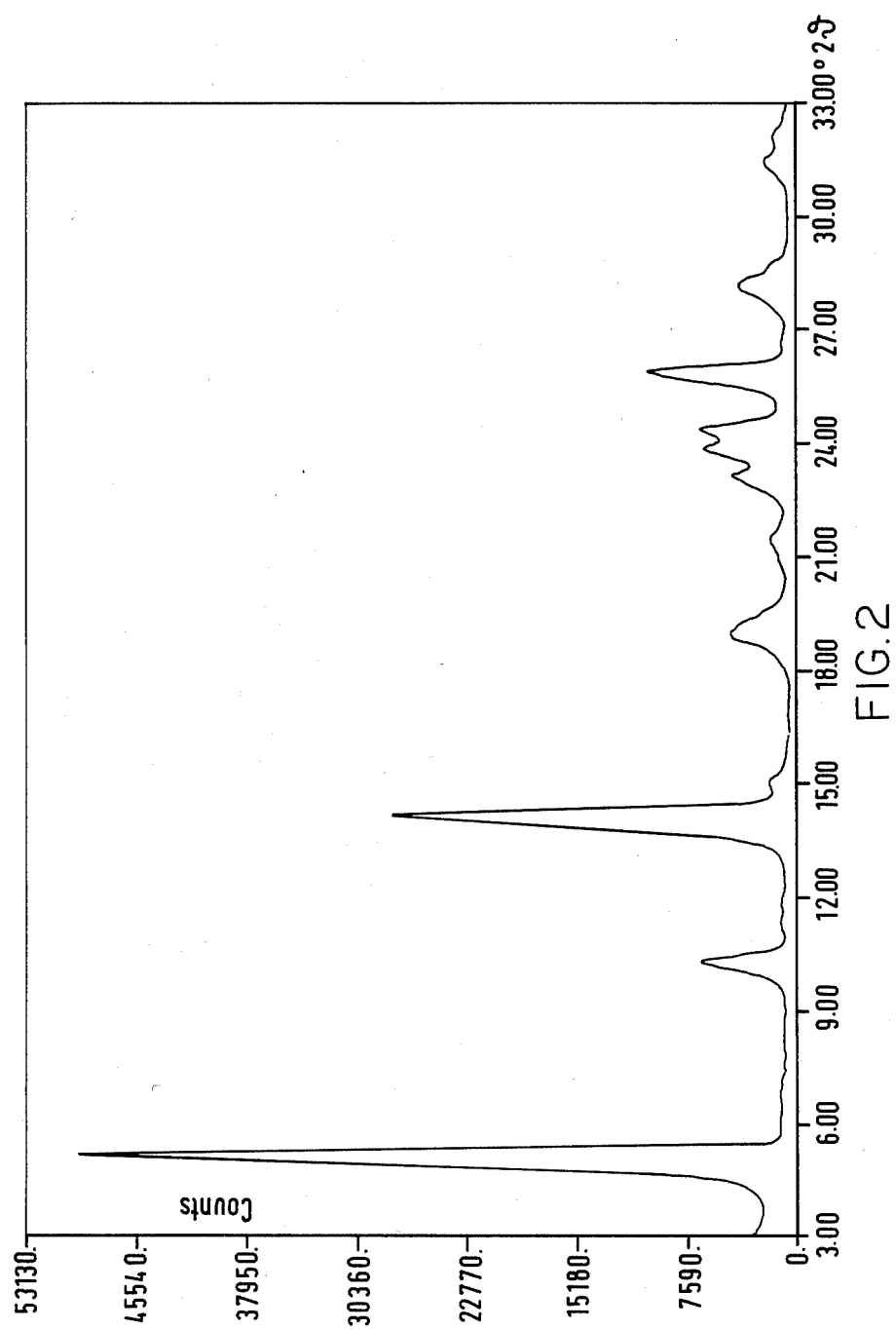

The crystallographic modification ("α-modification") of N,N'-bis-3',5'-dimethylphenylperylenetetracarbimide of the formula (1) is shown in the x-ray diffraction diagram shown in FIG. 1 (see appendix), where FIG. 2 (see appendix) shows the x-ray diffraction diagram of a typical mixcrystal obtainable according to the invention. It can be seen that the x-ray diffraction diagrams are identical and hence that the crystal lattices are identical.

The co-condensation is advantageously carried out with at least 2 moles of 3,5-dimethylaniline per mole of perylenetetracarboxylic dianhydride. It is preferable to use an excess of 4–16 moles of 3,5-dimethylaniline, however, the use of a greater excess of 3,5-dimethylaniline, although possible, is not advisable for economic reasons.

The preferred 4-ethoxyaniline and/or 4-methoxyaniline content in 3,5-dimethylaniline is between about 1 and about 3 percent by weight. It is preferable to use 4-ethoxyaniline.

The co-condensation reaction can be carried out in known manner, for example in accordance with the indications of German Patent No. 1,105,085 (British Patent No. 897,707), German Auslegeschrift 1,094,897 or previously cited German Patent No. 1,067,157 (U.S. Pat. No. 2,905,685), by reacting the mixture of reactants at elevated temperature of about 150°–220° C., in the presence or absence of a condensation assistant, in a high-boiling solvent, such as, for example, dichlorobenzene, trichlorobenzene, nitrobenzene, N-methylpyrrolidone, quinoline, phenols or in an excess of 3,5-dimethylaniline.

The reaction products can be separated off in conventional manner by filtration, if desired after prior dilution with a low-boiling alcohol, such as methanol. The composition of the mix-crystal reaction products obtained is dependent both on the 4-alkoxyaniline content in the 3,5-dimethylaniline and on the employed excess of 3,5-dimethylaniline. They essentially comprise about 99–70 mole percent of symmetrical diimide of the formula (1) and about 1–30 mole percent of asymmetrical diimide of the formula (2).

Preference is given to those mix-crystal compounds which are essentially composed of about 99–85 mole percent of symmetrical diimide of the formula (1) and about 1–15 mole percent of asymmetrical diimide of the formula (2) and in which the substituent R in formula (2) stands for the ethyl group.

To convert the resulting dry crude pigment into a finely divided, transparently coloring pigment form, the crude pigment can be milled conventionally, for example in a vibratory or roll mill, in the presence of milling assistants. The milling bodies generally used therein are steel or corundum balls or steel or corundum cylpebs. The milling assistants can be water-soluble salts, such as sodium sulfate, aluminum sulfate or sodium chloride, which, after the milling has been completed, are separated from the pigment in known manner by aqueous salt extraction.

Mix-crystal pigments of the perylenetetracarbimide series are already known. For instance U.S. Pat. No. 3,554,776 claims pigments comprising a solid solution of at least two perylenetetracarbimides. The compounds underlying these pigments are symmetrical N,N'-substituted perylenetetracarbimides. By comparison, the mix-crystals according to the invention where one component of the stated formula (2) is an asymmetrically substituted diimide have a different chemical composition. This is also true of the solid solutions of perylenetetracarbimide pigments disclosed in German Offenlegungsschrift 2,009,073 (Canadian Patent No. 912,757). These pigments are likewise mixtures composed of symmetrically N,N'-substituted perylenetetracarbimides.

It was not foreseeable that the co-condensation reaction according to the invention would produce in addition to the symmetrically substituted perylimide of the formula (1) essentially only the asymmetrically substituted perylimides of the formula (2).

The new mix-crystal pigments obtainable according to the invention are suitable for coloring paints and plastics, such as polyvinyl chloride, polystyrene or polyamide, and are particularly advantageous for pigmenting high-melting polymers, such as polyethylene and polypropylene, and for spin-coloring polypropylene. Compared with the perylene pigment of the stated formula (1) obtainable for example in accordance with German Patent No. 1,067,157 (U.S. Pat. No. 2,905,685) they have the same crystal modification—after corresponding conversion into a finely divided, transparently coloring pigmentary form—in high-melting organic polymers, in particular in polyolefins, and with equal tinctorial strength and a yellower hue also have a distinctly higher heat stability.

Compared with the known opaquely coloring pigmentary forms the bis-xylidide of the stated formula (1) disclosed in German Auslegeschrift 2,832,761 (U.S. Pat. No. 4,262,851) and European Patent No. 042,819 (U.S. Pat. No. 4,404,386), they have a distinctly yellower, purer hue and a superior tinctorial strength.

In the following examples, the percentages are by weight unless otherwise stated.

The x-ray diffraction diagrams were recorded with copper-Kα-radiation using a computer-aided D500 powder diffractometer from SIEMENS.

The mass spectra were recorded using an MS 50 double focus mass spectrometer from KRATOS (electron impact ionization, 70 eV, 380° C.).

EXAMPLE 1

62.0 g (0.158 mol) of perylenetetracarboxylic dianhydride are maintained at 185° C. with stirring in a mixture of 200 g (1.65 mol) of 3,5-dimethylaniline, 2.1 g (0.015 mol) of 4-ethoxyaniline and 466 g of quinoline for 7 hours after addition of 4.3 g of anhydrous zinc chloride. The precipitated reaction product is filtered off with suction at 100° C., and is then washed with methanol, then with 2% strength hydrochloric acid and finally with water until neutral. The filter cake is then washed with 2% strength potassium hydroxide solution until the filtrate running off is colorless and with the water until neutral, and is dried. This gives 93.3 g of the pure yellowish red, uniformly crystalline co-condensation product in the α-modification (see FIG. 2).

The mass spectrum distinctly shows, in addition to the main mass peak M+598 (component of the formula (1)) the mass peak M+614 of the asymmetrical component (formula 2). The molecular mass 630 of the symmetrical compound (formula 3) is not observed.

To convert into a finely divided pigmentary form, 30 g of co-condensation product are milled with 150 g of anhydrous sodium sulfate in a 1 liter plastics milling vessel holding 1400 g of corundum balls (diameter 12 mm) on a Vibratom vibrating table for 6 hours, and the mill base is dried after an aqueous salt extraction and is comminuted in an IK cross beater mill (from JANKE und KUNKEL). (The same method is also used to comminute the products obtained in the following examples).

EXAMPLE 2

A mixture of 39.2 g (0.1 mol) of perylenetetracarboxylic dianhydride, 2.0 g of anhydrous zinc chloride, 121 g (1.0 mol) of 3,5-dimethylaniline, 200 g of quinoline and 2.75 g (0.02 mol) of 4-ethoxyaniline is stirred at 180°–185° C. for 8 hours. The uniformly crystalline reaction product formed is isolated as described in example 1. 58.8 g of red mix-crystals of the α-modification are obtained.

The mass spectrum shows the mass peak M+598 (component of the formula (1)) and the mass peak M+614 (component of the formula 2)). The molecular mass 630 of the compound of the formula (3) is not observed.

EXAMPLE 3

A suspension of 39.2 g (0.1 mol) of perylenetetracarboxylic dianhydride in 99.5 g (0.8 mol) of 3,5-dimethylaniline having a 4-ethoxyaniline content of 2.7 percent by weight and 96.8 g of phenol is reacted at 175°–180° C. for 8 hours. Conventional isolation gives 59.1 g of yellowish-red co-condensation product in the α-crystal modification. The mass spectrum shows the mass peak m+598 (component of the formula (1)) and the mass peak M+614 (component of the formula (2)). The molecular mass 630 of the compound of the formula (3) is only visible as a trace amount.

EXAMPLE 4

39.2 g of perylenetetracarboxylic dianhydride are made to react at 180°–190° C. in a mixture of 48.4 g of 3,5-dimethylaniline, 3.1 g of 4-methoxyaniline, 200 g of quinoline and 4.1 g of anhydrous zinc chloride for 10 hours. After conventional working up, 59.3 g of mix-crystals of the α-crystal modification are isolated.

EXAMPLE 5

98.0 g of perylenetetracarboxylic dianhydride are reacted at 190° C. with 497 g of 3,5-dimethylaniline containing 2.7 percent by weight of 4-ethoxyaniline in the presence of 10.2 g of anhydrous zinc chloride. 8 hours of reaction is followed at room temperature by dilution with 500 ml of methanol and isolation of the co-condensation product in a known manner. 149.3 g are obtained in the α-crystal phase. The mass spectroscopy result corresponds to that of Example 3.

EXAMPLE 6

If the 2.75 g of 4-ethoxyanaline are replaced by an equivalent amount of 4-methoxyaniline and the procedure used is otherwise as described in Example 2, this, after isolation, gives 58.9 g of co-condensation product of the α-crystal modififation.

EXAMPLE 7

A mixture of 78.4 g (0.2 mol) of perylenetetracarboxylic dianhydride, 387 g (3.15 mol) of 3,5-dimethylaniline and 12.0 g of 4-methoxyaniline are reacted at 180°–190° C. in the presence of 8.1 g anhydrous zinc chloride for 7 hours. The reaction product formed is then separated off in known manner. The yield of co-condensation product present in the α-phase is 118.2 g.

EXAMPLE 8 (COMPARATIVE EXAMPLE)

62.0 g of perylenetetracarboxylic dianhydride are stirred at 185° C. in 210 g of 3,5-dimethylaniline in the presence of 3.2 g of anhyrous zinc chloride for 8 hours, and the resulting bis-xylidide of the formula (1) is isolated in known manner. The yield is 92.5 g (97.9% of theory). The reflection angles in the x-ray diffraction diagram (cf. FIG. 1 in the appendix) agree with the angles disclosed in the abovementioned Japanese patent application for the crystal phase, referred to as the α-modification, of this compound.

DETERMINATION OF THE HEAT STABILITY BY THE DIN 53 772-A TEST 0.75 g of the pigment to be tested and 500 g of polyethylene (®Hostalen GC 7260 powder) are mixed at room temperature and 2000 revolutions per minute in a Collin high-speed mixer for one minute. After addition of 7.14 g of ®Remafin White RCL-AE 30 (≅1% TiO$_2$) the mixture is extruded at 180° C. in 2 passes on an extruder (Weber ET 20). The resulting granulate is subsequently molded on an injection molding machine (Aarburg Allrounder 221 E/170 P) into sheets at test temperatures of 200°–300° C. in intervals of 20° C. and a dwell time of 5 minutes.

| Results (standard depth of shade ⅓ after DIN 53 235) | | |
|---|---|---|
| Example | Heat stability (color difference $\Delta E^*_{ab} = 3$) | Hue angle DIN 6174 |
| 1 | >300° C. | 24.9° |
| 2 | >300° C. | 25.6° |
| 3 | >300° C. | 25.1° |
| 4 | >300° C. | 23.9° |
| 5 | >300° C. | 25.6° |
| 6 | >300° C. | 24.1° |
| 7 | >300° C. | 24.2° |
| 8 (comparison) | 270° C. | 23.3° |

The results of the above table show the superior heat stability and the yellower hue of the mix-crystal pigments according to the invention compared with the pure perylene pigment of the formula 1.

We claim:

1. Crystallographically unitary crystal pigments in the crystal lattice of the α-modification of the N,N'-bis-3',5'-dimethylphenylperylenetetracarbamide of the following formula

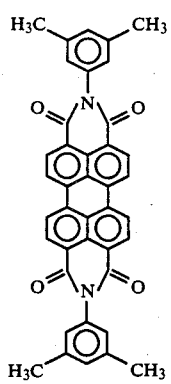

produced by condensing 1 mole of perylenetetracarboxylic dianhydride with an excess of up to 30 moles of 3,5-dimethylaniline which contains in total 0.5-6 percent by weight of 4-ethoxyaniline and/or 4-methoxyaniline to form crystallographically unitary crystal pigments comprised of essentially symmetrical N,N'-bis-3'5'-dimethylphenylperylene-tetracarbimide of the formula (1)

and at least one asymmetrically substituted diimide of the formula (2) in which R stands for a methyl or ethyl group

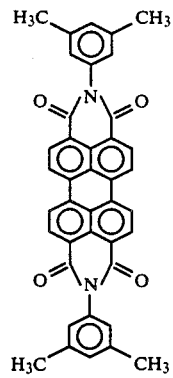

(1)

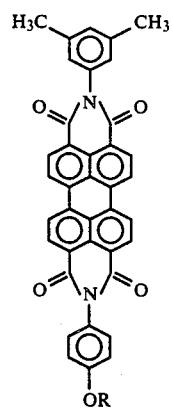

(2)

* * * * *